US007092902B2

(12) United States Patent
Eldridge et al.

(10) Patent No.: US 7,092,902 B2
(45) Date of Patent: *Aug. 15, 2006

(54) AUTOMATED SYSTEM FOR DESIGNING AND TESTING A PROBE CARD

(75) Inventors: Benjamin N. Eldridge, Danville, CA (US); Mark W. Brandemuehl, Mountain View, CA (US); Stefan Graef, Milpitas, CA (US); Yves Parent, San Francisco, CA (US)

(73) Assignee: FormFactor, Inc., Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/810,758

(22) Filed: Mar. 26, 2004

(65) Prior Publication Data

US 2004/0181486 A1 Sep. 16, 2004

Related U.S. Application Data

(63) Continuation of application No. 09/954,617, filed on Sep. 17, 2001, now Pat. No. 6,714,828.

(51) Int. Cl.
*G06Q 30/00* (2006.01)

(52) U.S. Cl. .............................. 705/26; 705/1; 705/50; 705/80; 700/83; 700/96; 700/97; 700/117; 700/180; 324/761

(58) Field of Classification Search .................. 705/1, 705/26, 50, 80; 700/96, 97, 117, 121, 83, 700/180; 709/203; 703/14–16; 716/19; 324/761

See application file for complete search history.

(56) References Cited

U.S. PATENT DOCUMENTS 4,873,623 A * 10/1989 Lane et al. .................. 700/83
4,967,381 A * 10/1990 Lane et al. .................. 702/81
5,042,148 A    8/1991 Tada et al.
5,065,092 A   11/1991 Sigler
5,539,652 A *  7/1996 Tegethoff .................... 703/14

(Continued)

FOREIGN PATENT DOCUMENTS

EP        0 740 160 A1 * 10/1996

(Continued)

OTHER PUBLICATIONS

Keutzer et al., System-Level Design: Orthogonalization of Concerns and Platform-Based Design, Dec. 2000, IEEE Transactions on Computer-Aided Design of Integrated Circuits and Systems, vol. 19, No. 12, pp. 1523-1543.*

(Continued)

*Primary Examiner*—James P. Trammell
*Assistant Examiner*—Bradley B. Bayat
(74) *Attorney, Agent, or Firm*—N. Kenneth Burraston

(57) ABSTRACT

A method and system for designing a probe card from data provided by prospective customers via the Internet is provided. Design specifications are entered into the system by prospective customers and compiled into a database. The collective feasibility of each set of design specifications is determined by an automated computer system and communicated to the prospective customer. If feasible, additional software enables prospective customers to create verification packages according to their respective design specifications. These verification packages further consist of drawing files visually describing the final design and verification files confirming wafer bonding pad data. Verification packages are reviewed and forwarded to an applications engineer after customer approval. An interactive simulation of probe card performance is also provided. Data on probe card performance is incorporated into an overall modeling exercise, which includes not only the probe card, but data on the device(s) under test and wafer, as well as data on automated test equipment.

11 Claims, 6 Drawing Sheets

U.S. PATENT DOCUMENTS

| | | | |
|---|---|---|---|
| 5,712,858 A | 1/1998 | Godiwala et al. | |
| 5,801,432 A * | 9/1998 | Rostoker et al. | 257/666 |
| 5,812,415 A * | 9/1998 | Baisuck | 716/11 |
| 5,818,249 A | 10/1998 | Momohara | |
| 5,829,128 A | 11/1998 | Eldridge et al. | |
| 5,864,946 A | 2/1999 | Eldridge et al. | |
| 5,896,294 A * | 4/1999 | Chow et al. | 700/121 |
| 5,900,738 A | 5/1999 | Khandros et al. | |
| 5,917,707 A | 6/1999 | Khandros et al. | |
| 5,974,662 A | 11/1999 | Eldridge et al. | |
| 5,983,493 A | 11/1999 | Eldridge et al. | |
| 5,994,152 A | 11/1999 | Khandros et al. | |
| 6,029,344 A | 2/2000 | Khandros et al. | |
| 6,032,356 A | 3/2000 | Eldridge et al. | |
| 6,042,712 A | 3/2000 | Mathieu | |
| 6,043,563 A | 3/2000 | Eldridge et al. | |
| 6,049,895 A | 4/2000 | Sugimoto | |
| 6,050,829 A | 4/2000 | Eldridge et al. | |
| 6,064,213 A | 5/2000 | Khandros et al. | |
| 6,090,261 A | 7/2000 | Mathieu | |
| 6,113,646 A | 9/2000 | Holden | |
| 6,115,835 A * | 9/2000 | Nevill et al. | 714/724 |
| 6,139,177 A | 10/2000 | Venkatraman et al. | |
| 6,144,933 A | 11/2000 | Guccione | |
| 6,167,537 A | 12/2000 | Silva et al. | |
| 6,218,910 B1 | 4/2001 | Miller | |
| 6,223,092 B1 | 4/2001 | Miyakawa et al. | |
| 6,249,133 B1 | 6/2001 | Schwindt | |
| 6,255,602 B1 | 7/2001 | Evans et al. | |
| 6,265,888 B1 | 7/2001 | Hsu | |
| 6,578,174 B1 * | 6/2003 | Zizzo | 716/1 |
| 6,594,799 B1 * | 7/2003 | Robertson et al. | 716/1 |
| 6,701,474 B1 * | 3/2004 | Cooke et al. | 714/724 |
| 6,714,828 B1 | 3/2004 | Eldridge et al. | |
| 6,748,287 B1 * | 6/2004 | Hagen et al. | 700/99 |
| 6,851,094 B1 * | 2/2005 | Robertson et al. | 716/1 |
| 2001/0016061 A1 * | 8/2001 | Shimoda et al. | 382/149 |
| 2002/0091979 A1 * | 7/2002 | Cooke et al. | 714/733 |
| 2004/0210413 A1 * | 10/2004 | Dorough et al. | 702/117 |

FOREIGN PATENT DOCUMENTS

| | | |
|---|---|---|
| WO | WO 00/33096 | 6/2000 |

OTHER PUBLICATIONS

Claasen-Vujcic, Tanja, Analysis of a 200/300mm vertical furnace with integrated metrololgy, Apr. 2001, PennWell Publishing, vol. 44, No. 4, p. S6.*

* cited by examiner

AUTOMATED SYSTEM FOR DESIGNING AND TESTING A PROBE CARD

RELATED APPLICATION(S)

This application is a continuation of application Ser. No. 09/954,617, filed Sep. 17, 2001 (now U.S. Pat. No. 6,714,828).

BACKGROUND OF THE INVENTION

1. Field of the Invention

The present invention relates to an interactive probe card design process. In particular, this invention allows for the design of customized probe cards by utilization of an automated procedure available through the Internet.

2. Description of Related Art

Individual integrated circuit devices (dies) are typically produced by creating several identical devices on a semiconductor wafer. In general, these processes are intended to create a plurality of fully functional integrated circuit devices prior to severing the individual dies from the semiconductor wafer. In practice, however, certain physical defects in the wafer itself and certain defects in the processing of the wafer inevitably lead to some of the dies being "good" (fully-functional) and some of the dies being "bad" (non-functional or partially functional). It is generally desirable to be able to identify which of the plurality of dies on a wafer are good dies prior to final packaging, and preferably prior to the die being severed from the wafer. To this end, a wafer "tester" or "probe" may advantageously be employed to make a plurality of discrete pressure connections to a like plurality of discrete connection pads (bond pads) on the dies. In this manner, the semiconductor dies can be tested and exercised, prior to severing the dies from the wafer. A conventional component of a wafer tester is a "probe card." The probe card has a plurality of probe elements for effecting connections to the respective bond pads of the semiconductor dies for testing.

Historically, the manufacturing design phase for probe cards has necessarily involved significant, and often extensive and time-consuming, substantive communications between the customers and probe card manufacturers, for example, the interactions necessary to reach the desired design specifications, implementations and fabrication constraints necessary to finalize the probe card design. Although a probe card manufacturer engineer may receive several work orders at a given time, the actual design of a particular probe card cannot begin until a certain amount of customer-specific design information is provided. Preferably, actual design does not begin until all design specifications are confirmed with the customer. Next, the engineer must develop a design satisfying these specifications and again confirm the acceptability of the design with the customer.

The advent of the Internet has potentially expedited the design process by allowing probe card manufacturers to more readily communicate with their customers. In particular, websites maintained by current probe card manufacturers have enabled customers to send and confirm their design requirements via the Internet. Despite this communication advancement, an engineer must still physically design each probe card and await the respective customer approval of each design before manufacturing can begin. In order to improve upon this procedure, an on-line tool enabling customers to design their own probe cards is provided by this invention.

SUMMARY OF THE INVENTION

The present invention fulfills the need to expedite current probe card design procedure. In particular, an interactive process is provided in which customers input their probe card design requirements and receive complete design specifications for design implementation and files for verification. The collective feasibility of each set of design requirements is determined by an automated computer system and communicated to the customer. If feasible, additional software enables prospective customers to create verification packages according to their respective design specifications. These verification packages further include drawing files visually describing the final design and verification files, e.g., files confirming wafer bonding pad data. Verification packages are reviewed and modified by the customer as needed. This process then proceeds iteratively until the customer is satisfied with the final design, at which point the design specification and verification package is forwarded to a probe card manufacturer design engineer for fabrication.

In another embodiment, the present invention provides a probe card simulation in which the prospective customer can check the signal integrity of a proposed design and determine a calculated "worst case" signal response or decoupling behavior. In addition to verifying signal response and decoupling behavior during simulation, in another embodiment other design factors and parameters can be simulated, such as functional correctness, delay correctness, global and local signal skew (within specified groups or between all signals), cross-talk analysis (delayed, introduced or otherwise), power integrity, jitter effects, etc.

In another embodiment, an interactive simulation of probe card performance is enabled. Data on probe card performance is incorporated into an overall modeling exercise, which includes not only the probe card, but data on the device(s) under test (or DUT), as well as data on the automated test equipment.

A more complete understanding of the method and system for designing a probe card will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

This invention satisfies the need for an Internet-accessible system for creating the specifications and design requirements for a customized probe card and the verification packages for confirming the correctness of the design and finalizing files for fabrication. In particular, this system allows customers to design and verify probe cards interactively, including through simulations, thereby reducing the amount of time involved in the probe card ordering process. In the detailed description that follows, like element numerals are used to describe like elements illustrated in one or more of the figures.

Figure 1A:
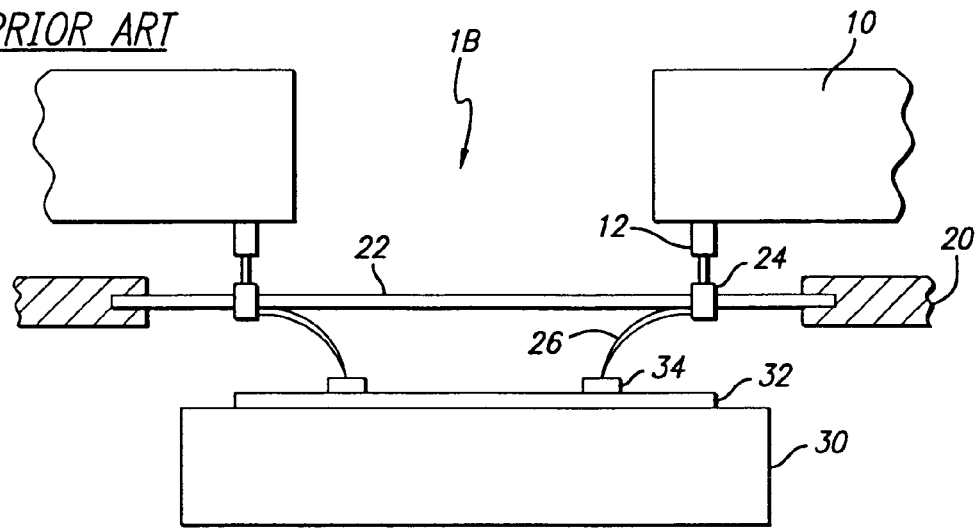
FIG. 1A is a sectional view schematically showing a wafer probing apparatus for wafer testing.
Figure 1B:
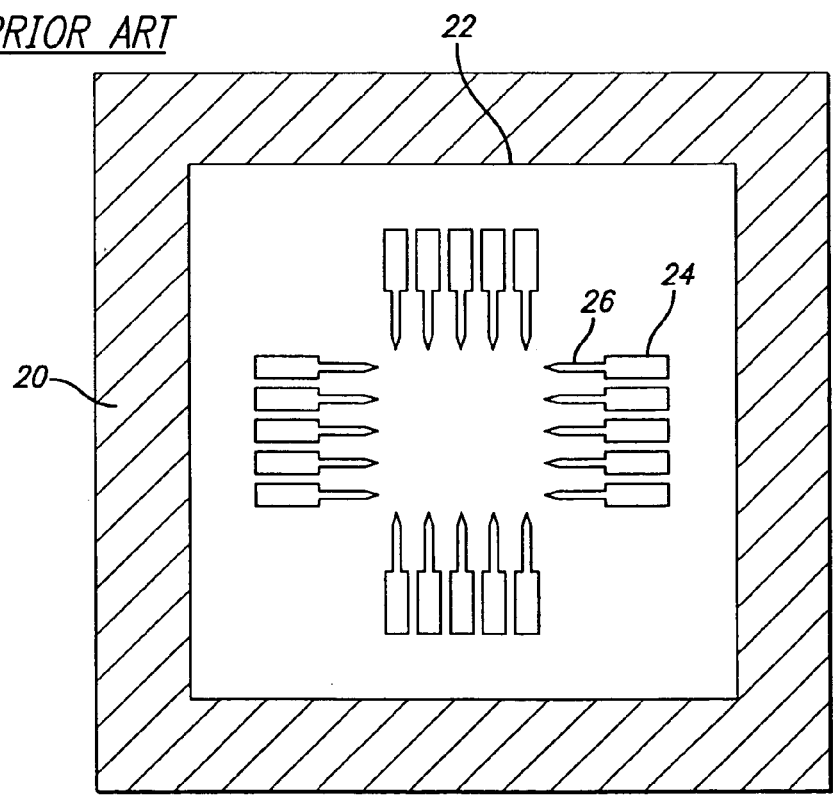
FIG. 1B is a transparent plan view of a wafer probing apparatus as seen in the direction indicated by arrow 1B in FIG. 1A.

In FIG. 1A, a sectional view schematically illustrating a wafer probing apparatus for wafer testing is shown. A wafer 32 including a plurality of semiconductor devices or die (not independently shown) is fixed on a wafer chuck 30. A large number of bonding pads 34, for example, on the order of several hundred, are formed on the upper surface of each die. Probes 26, respectively corresponding to each bonding pad 34, are arranged and held on a probe holding plate 22 positioned directly above the wafer 32. A plan view schematic of this probe arrangement is shown in FIG. 1B, where a transparent plan view of this wafer probing apparatus as seen in the direction indicated by arrow 1B in FIG. 1A is provided. The probe holding plate 22 is held fixed on a plate holding member 20 and further includes several conductive patterns 24 that are electrically connected to each respective probe 26. These conductive patterns 24 are also electrically connected to an array of pogo pins 12 respectively situated on a wafer test head 10.

Figure 2:
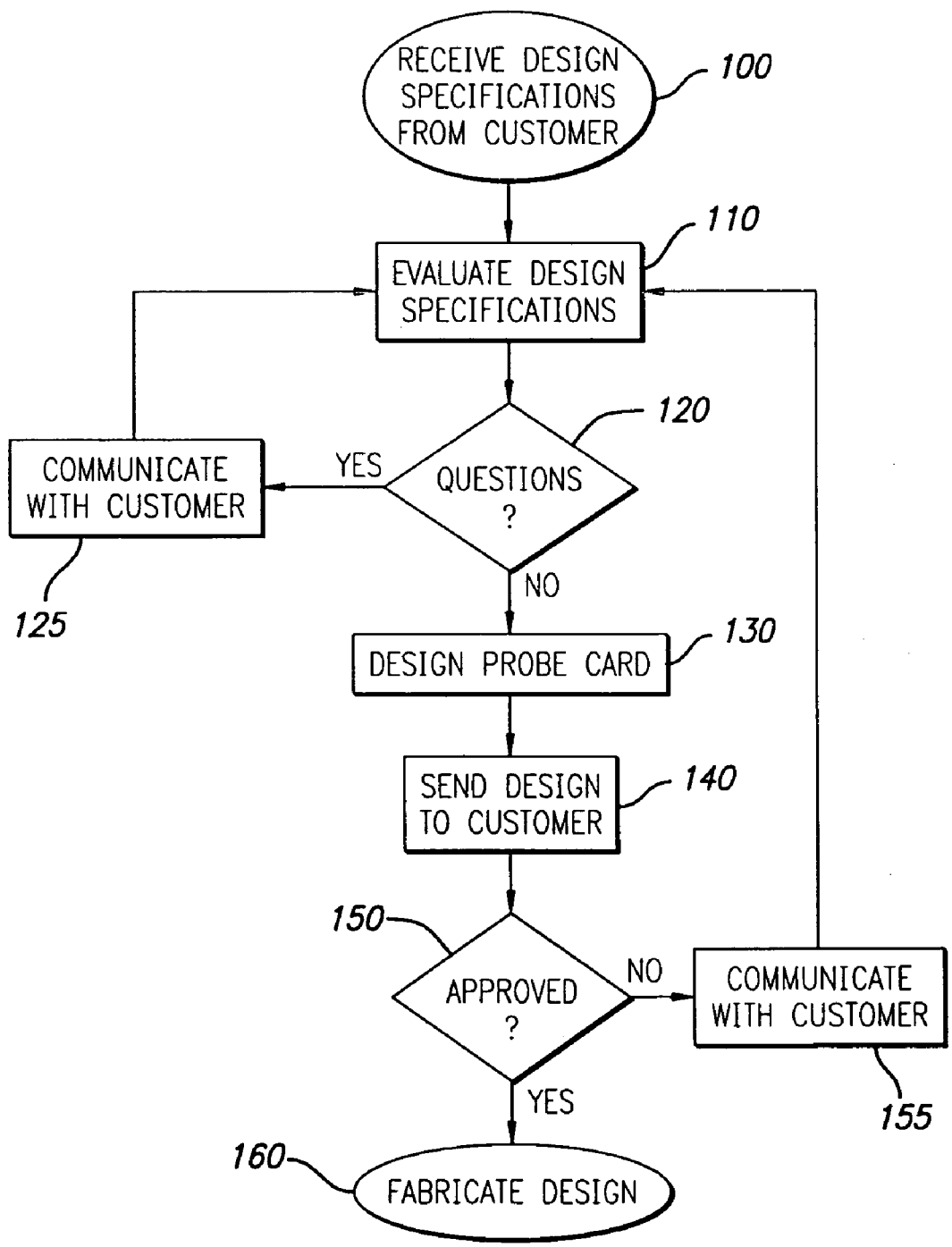
FIG. 2 is a flow chart describing the conventional procedure for designing a probe card.

In FIG. 2, a flow chart describing the conventional procedure for designing a probe card is shown. This procedure begins at step 100, when a probe card manufacturing company receives general design specifications from a customer for a particular probe card. These design specifications are forwarded to an engineer where they are evaluated at step 110. If the engineer has questions regarding these specifications at step 120, the customer is contacted at step 125 and the specifications are re-evaluated at step 110; otherwise, the engineer generates a preliminary design of the probe card at step 130. This preliminary design is sent to the customer at step 140, at which point it will be approved at step 150, or will be the subject of further communication at step 155. If the customer at step 150 approves the design, fabrication of the design follows at step 160; otherwise, the customer specifies which design modifications need to be made at step 155 and the design is re-evaluated at step 110. It should be appreciated that there is a great deal of interaction between the probe card manufacture engineer and the customer before a design is finalized.

Figure 3:
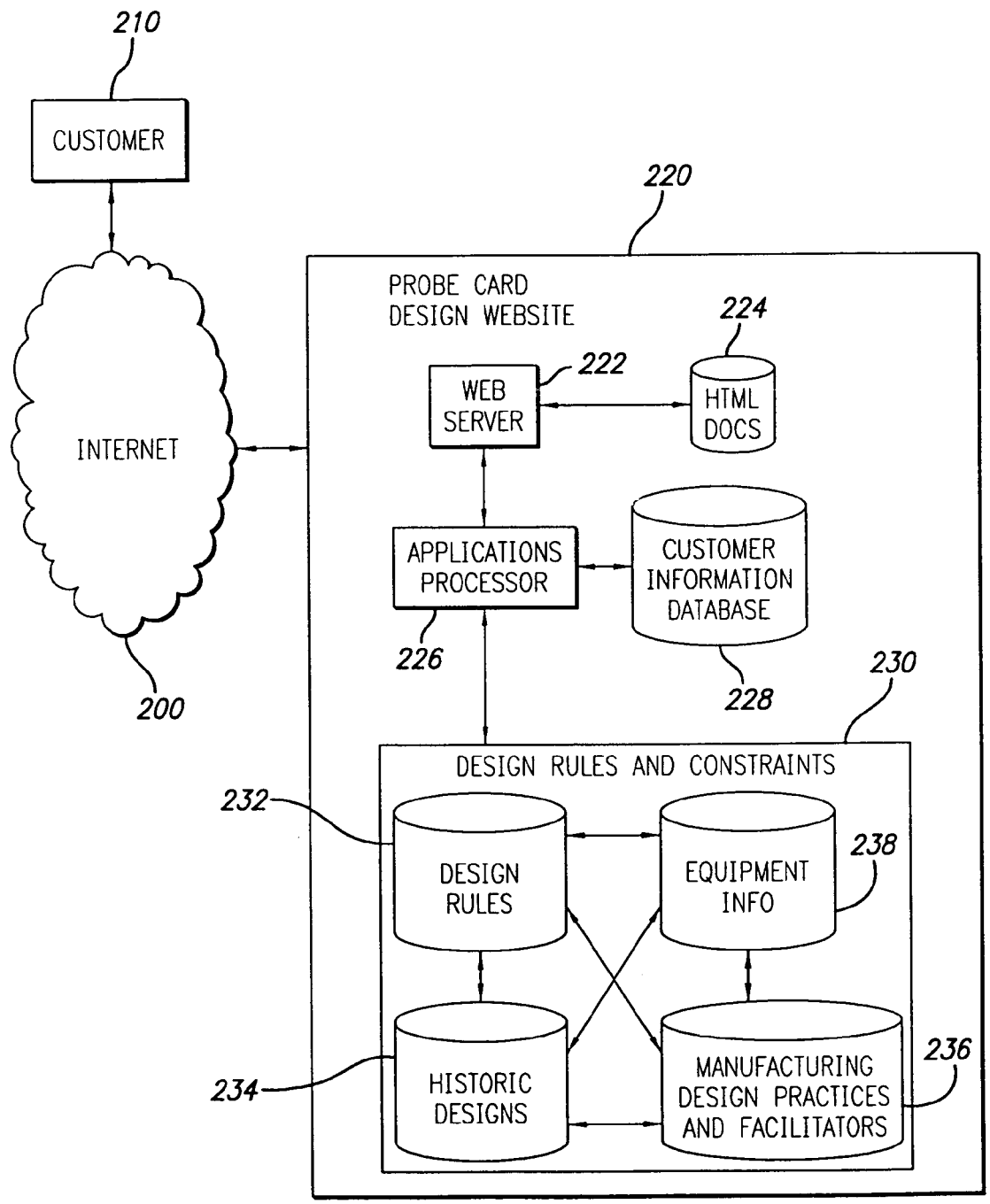
FIG. 3 is a block diagram demonstrating a preferred embodiment of the invention.

In FIG. 3, a block diagram illustrates a preferred embodiment of the invention. In particular, a prospective customer 210 is shown connected to a probe card design website 220 via the Internet 200. The customer 210 comprises some form of computing device having a browser application adapted to communicate over the Internet, such as a personal computer, laptop computer, personal digital assistant (PDA), cellular telephone, and the like. As illustrated, the probe card design website 220 further includes a web server 222 directly linked to an HTML (Hyper-Text Markup Language) documents database 224 and an applications processor 226. Also linked to the web server 222, via the applications processor 226, is a customer information database 228, which might also include historic designs by the customer 210 as well as certain customer specific design constraints or parameters, and a design constraints database 230. The design constraints database 230 contains libraries of design rules 232, historic designs 234 (e.g., to the extent not comprising the confidential information of the purchaser of a customized probe card), manufacturing/design practices and facilitators 236 (e.g., design parameters or rules that will result in the creation of a more efficient design, or a more easily, and expeditiously, manufactured probe card, as well as space claim concerns and other mechanical constraints that will impact the selection of electrical parts), and equipment information 238 (e.g., parameters and constraints of particular tester machines). By way of further explanation, the practices and facilitators database 236 may include a guide that advises customer 210 in utilizing design easing factors like modified pogo assignments, DUT scramble, LGA assignment-floor planning, netlisting, etc. Practices and facilitators database 236 may also provide suggested design modifications that would simplify the design and make it cheaper (e.g., less PCB layers, less hand-routing, less SXF layers) or would significantly speed up the design cycle (e.g., provide for the reuse of major parts of the design, such as the PCB or brick). The web server 222 handles communications to and from the website 220, and delivers data in the form of HTML documents to the customer 210 through the Internet 200. The applications processor 226 provides certain data processing applications and communicates with the web server 222.

Through the probe card design website 220, the customer 210 can establish a password-protected account that can be used to access an automated application executing on the applications processor 226 to design and verify customized probe cards. Files confirming this design are then automatically generated by the applications processor 226 and entered into the customer information database 228. Existing design automation applications may be attached to the HTML documents in database 224 to assist in the generation of verification data, which is in substance an actual design created for verification purposes. An engineer then receives these design files and approves them before fabrication. While a single customer 210 is shown in FIG. 3, it is anticipated that many individual customers can communicate with the probe card design website 220 in like manner.

Figure 4:
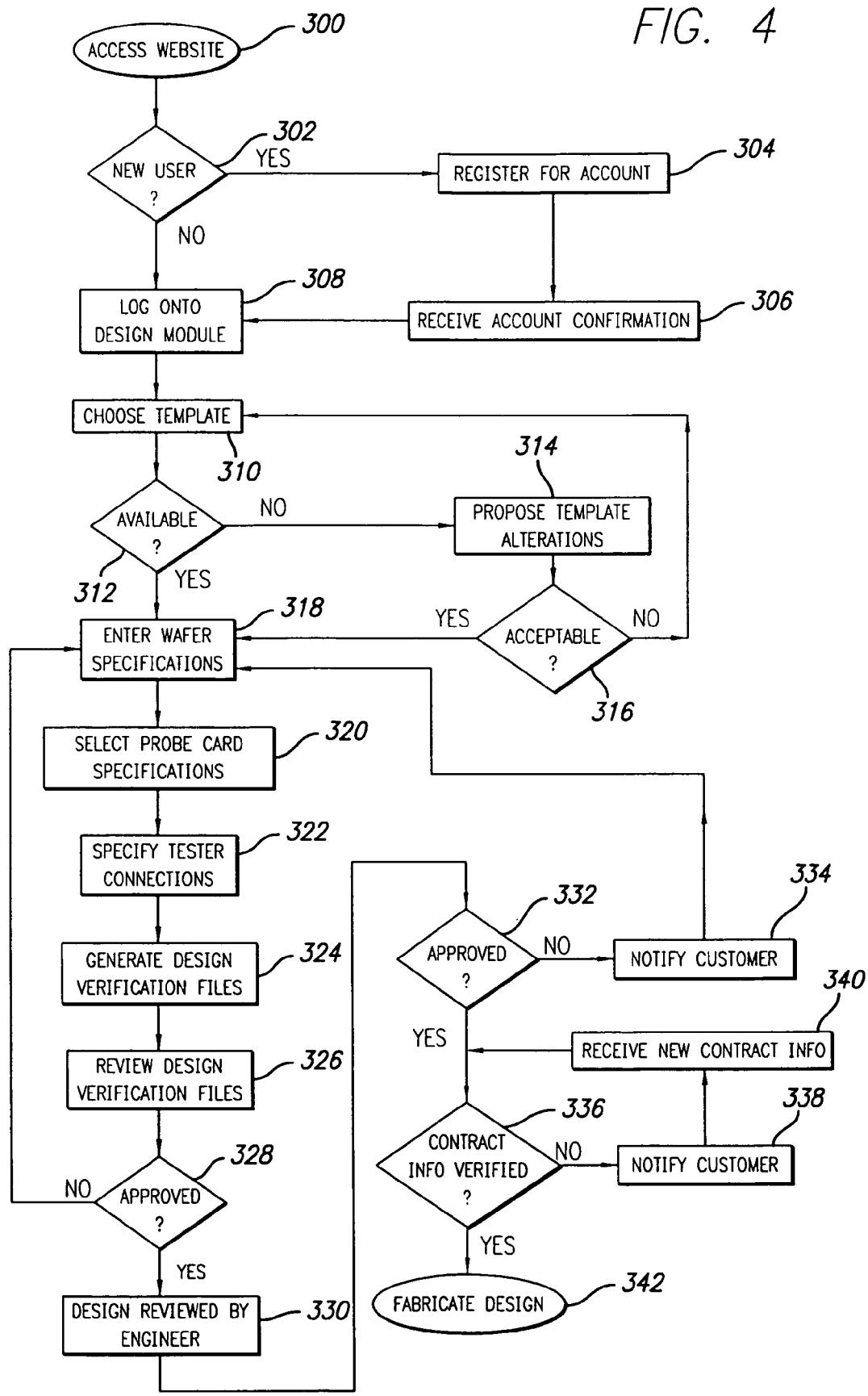
FIG. 4 is a flow chart describing a procedure for designing a probe card according to an embodiment of the invention.

In FIG. 4, a flow chart illustrates this automated procedure for designing a probe card according to an embodiment of the invention. A prospective customer 210 begins this process by accessing the probe card design website 220 at step 300. If the prospective customer 210 has an existing on-line account at step 302 (which is, in a preferred embodiment, part of the customer information database 228), this account is logged onto at step 308; otherwise, the prospective customer 210 must first register for an account at step 304 and receive account confirmation at step 306 before accessing it at step 308. It should be noted that part of the registration procedure may include entering billing and shipping information and the like that is later used to charge the customer's account.

Once an account is accessed, the customer 210 is asked at step 310 to choose from a set of pre-defined probe card templates containing specifications that are re-used from design to design. Specifications in these templates include the tester model, the physical configuration of the tester, standard rules for placement of electronic components, standard manufacturing specifications, standard graphics, etc. to be put on the probe card. If the desired template is not available at step 312, the customer 210 is asked to complete this information interactively through the probe card design website 220 at step 314. The feasibility of this customer-proposed alteration of the specification of the template is then verified in an automated manner by the application at step 316. This initial verification may be accomplished by comparing the proposed alteration of the template specification, as the case may be, against a database or table of known, acceptable designs, or alternatively, the proposed template may be subjected to an automated or simulated test sequence. If the template is determined at step 316 to be not acceptable, the procedure returns to step 310 where the customer 210 is asked to generate further alterations or design changes for the template. Reliance may also be made upon the design rules library 232 or design practices library 236 to facilitate finalization of the specification. Otherwise, if the template is determined to be acceptable, the customer 210 is then asked to enter more detailed specifications describing their particular wafer 32, such as bonding pad 34 orientation, wafer 32 dimensions, and signal characteristics, onto an on-line customer information form at step 318. It is contemplated that templates may be customer specific. Accepted, and even proposed, alterations to the templates for a specific customer may also be stored within the customer information database 228.

Next, at step 320, the customer 210 selects the desired probe card specifications using a series of pull-down menus, including probe card dimensions, pogo pin 12 orientation, and number of probes 26. It is noted that the pogo pin orientation is preferably fixed-frozen in the template; only in the exceptional case would pogo pads need to be rotated once they are assigned optimally in the template. At step 322, customer 210 confirms the "tester channel assignments" defining the connections between the tester and the chip through the probe card. A schematic showing the connections for one die is returned, including standard components already defined in the probe card template. Once the single die definition is accepted, customer 210 can either manually edit this schematic to include additional components as required from a standard library of components or allow the application to generate them automatically. If specialized components are required, the customer can specify these new components with a vendor, part number and description. It should be appreciated that the number of pull-down menus is not limited to three as described above, but can be any number of design elements. A template will exist for each of the pieces of the design process (or design factors), as well as for mechanical elements of the probe card, e.g., stiffeners, interposers, brackets, areas allocation, electrical components, each of which is approved individually and, then, collectively as a complete design.

It should be appreciated that customer 210 may receive verification information interactively at each step of the described process. As noted, this information may also include design automation applications to help generate verification data. A schematic drawing of bonding pads 34 on a particular die, for example, may be automatically generated in order to confirm pad placement, pad naming, and orientation. Once confirmed, the process will automatically generate a layout based on pre-defined layout rules. If the layout can be generated with pre-defined rules, it is displayed to the customer 210 to verify the match between the probe element contact tip location and the relative pad location, as well as the signal type. Otherwise, the customer 210 is informed and given the opportunity to further modify the probe card specification and repeat the layout generation. At this point, the customer is prompted to proceed to the next step. A similar procedure, is used for other orientation information including array layout, orientation of array versus wafer notch, and orientation of wafer notch to tester. For simplicity, these individual verification steps are not shown in FIG. 4 but are instead considered respective parts of steps 318, 320, and 322. It is also noted that the probe card design is not necessarily limited to probing identical die on a wafer. Rather, the probe card design may be such that many non-identical die on a single wafer may be probed.

By way of further explanation, the template selection process may more specifically include a number of sub-templates, for example: (1) a probe layout application that demonstrates the probe layout possibilities, single device-under-test (DUT) and then multiple DUTs; (2) a space transformer application that will select the brick and implement net lists; (3) a PCB application that will, for example, include layer count, DUT arrangements and route-ability. Customer specific templates will be stored within the user profile 228, as opposed to the treatment of generic templates which may be accessed by any customers through a generic template database on website 220. The feasibility/customer verification steps 318 to 324 enable the customer to provide precise design specifications, and to confirm the acceptability of designs prior to the manufacturer investing significant time and money into the design process, thereby minimizing necessary design corrections and the likelihood of manufacturer design errors.

Once completed, the customer information form is used to generate a design verification package at step 324. This verification package includes a drawing file, verification file, and checklist document that are reviewed by the customer 210 at step 326. If the customer 210 at step 328 approves the design, it is then reviewed by an engineer at step 330. It should also be appreciated that this review step 330 may be omitted an/or replaced with an automated system comparison for obtaining approval, thereby further reducing engineer time and requirements in the design and approval process. If the customer 210 does not approve the design, the customer 210 is returned to step 318 where a pre-filled version of the customer information form is provided for modification and approval. If approved by the probe card manufacturer engineer (or system) at step 332, verification of contract information is accomplished at step 336. If not verified, the customer 210 is notified at step 334 and returned to step 318 where a pre-filled version of the customer information form is provided highlighting which specifications need modifying. If contract information (such as pricing, timing and delivery constraints, shipping requirements, etc.) is verified at step 336, the design is then processed to fabrication at step 342. In actuality, the fabrication may entail further and additional design steps, for instance, brick and PCB layouts and netlists. The flow of FIG. 4 produces a feasibility analysis and confirmation for a custom probe card design and a product contract for the design. Conversely, if the contract information is not verified at step 336, the customer 210 is notified at step 338 and asked to revisit the information at step 340. After receiving this new information at step 340, contract information again goes through the verification process at step 336.

It should be noted that customer 210 can stop the probe card design session and re-enter at any time. Until the customer 210 completes the process, the design is considered "in process" and no revision control is exercised on changes. Once the design is "completed" by the customer 210, it is put under revision control and any changes to the design thereafter are logged and stored in the customer information database 228. It should be appreciated that the customer can go through the entire probe card design process without having to communicate or interact with a probe card manufacturer applications engineer. Where the customer 210 desires to communicate with an applications engineer, the customer may also have the option of conducting an on-line interactive meeting with the applications engineer where the customer 210 and engineer are speaking via phone and reviewing the design through the website 220 simultaneously. The applications engineer would then be able to review the status of the probe card design process and ascertain which steps of the process have been completed.

Figure 5:
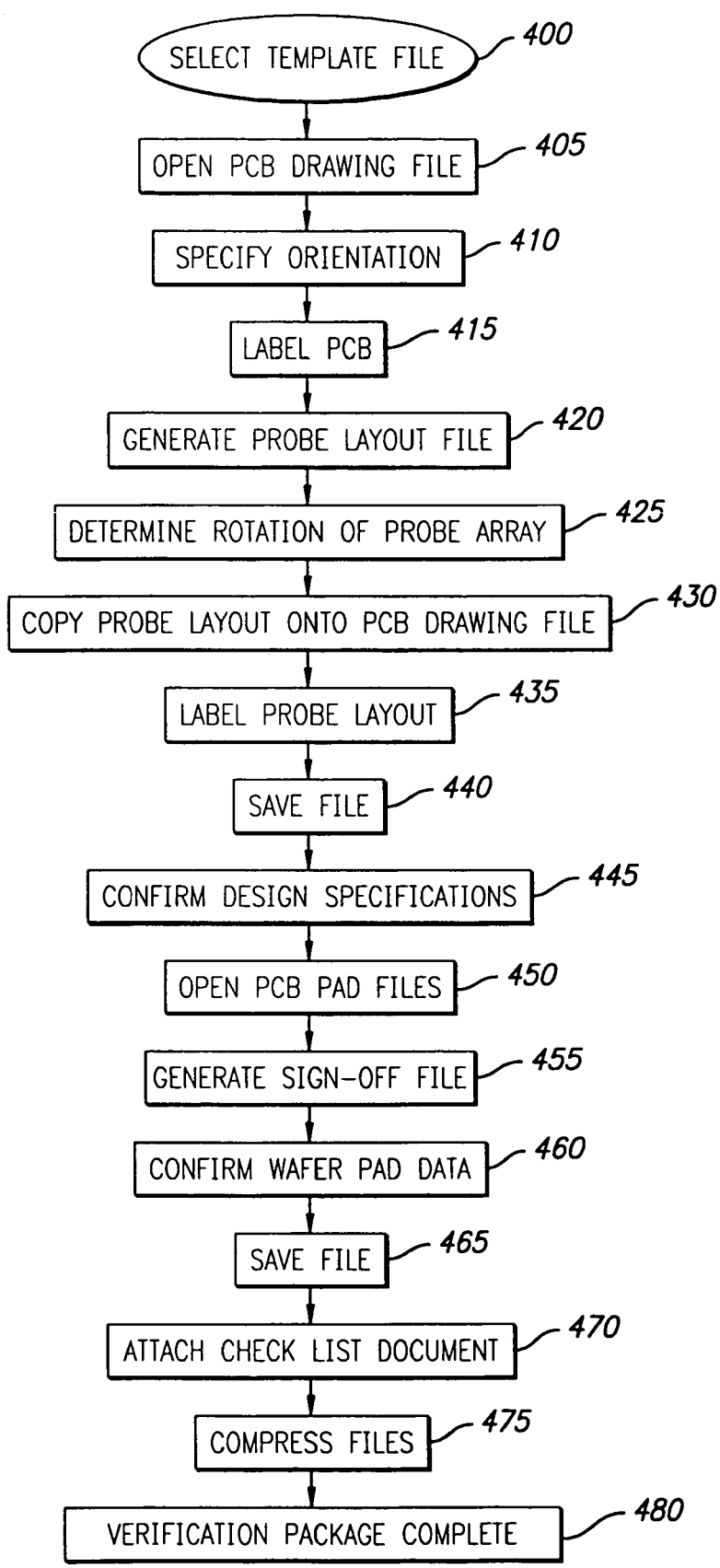
FIG. 5 is a flow chart illustrating the steps toward generating a design verification package according to an embodiment of the invention.

In FIG. 5, a flow chart illustrates the steps towards generating a design verification package according to an embodiment of the invention. The customer 210 begins this process by retrieving its template file from within the probe card design system database 224 at step 400. At this point, the template file is preferably an approved design. The customer 210 continues by opening a printed circuit board (PCB) drawing file at step 405 and then specifying the correct pogo pin 12 orientation(s) at step 410. At step 415, the PCB is then labeled with information relevant to that particular PCB design including the customer design name and wafer view designation. Once the PCB is labeled, a probe layout file is generated at step 420. An embedded function within the probe card design system 220 then determines the correct rotation of the probe array 26 for this particular design at step 425. It should be appreciated that steps 420 and 425 could also be executed in parallel with steps 405, 410 and 415. At step 430, this procedure continues with the probe layout being copied onto the PCB drawing file. Step 435 follows with the labeling 6f the relevant mechanical information for the design, such as the PCB diameter, bonding pad 34 dimensions, and probe array 26 orientation. This drawing file is then saved to a verification package directory located within the probe card design system database 224 at step 440.

At step 445, the system performs a general check in order to confirm that the drawing file is consistent with the information provided by the customer. Bonding pad 34 information is then imported from the probe card design system database 224 at step 450 and used to generate the verification file for this particular design at step 455. It should be noted that information regarding the characteristics of each respective bonding pad 34 is included in this verification file. In particular, this verification file includes the location of each individual bonding pad 34 relative to the wafer 32 (e.g., expressed in xy-coordinates) and the type of signal being probed. At step 460, the consistency of this bonding pad 34 data relative to information provided by the customer is confirmed. After confirming its fidelity, this verification file is then saved together with its corresponding drawing file into a verification package directory of the probe card design system database 224 at step 465. At step 470, a checklist document is attached to the verification package directory where it is then compressed together with the already generated drawing and verification files at step 475. After these files are compressed, the verification package is complete and made available to the customer at step 480. The customer 210 may also be able to retrieve and review the verification files at intermediate points in this process, such as for conducting off-line analysis. The verification files may also be encrypted using conventional techniques to protect the confidentiality of the customer's design.

It should be appreciated that the procedure described above is a generalization of what would likely be a highly interactive process. It should be further appreciated that this procedure would likely occur during the design phase enabling the customer 210 to experiment with different bonding pad 34 layouts according to the design capabilities of current probe card construction methodology. As a result, the probe card design website 220 would only allow customer 210 to proceed with designs that are consistent with such methodologies.

Figure 6:
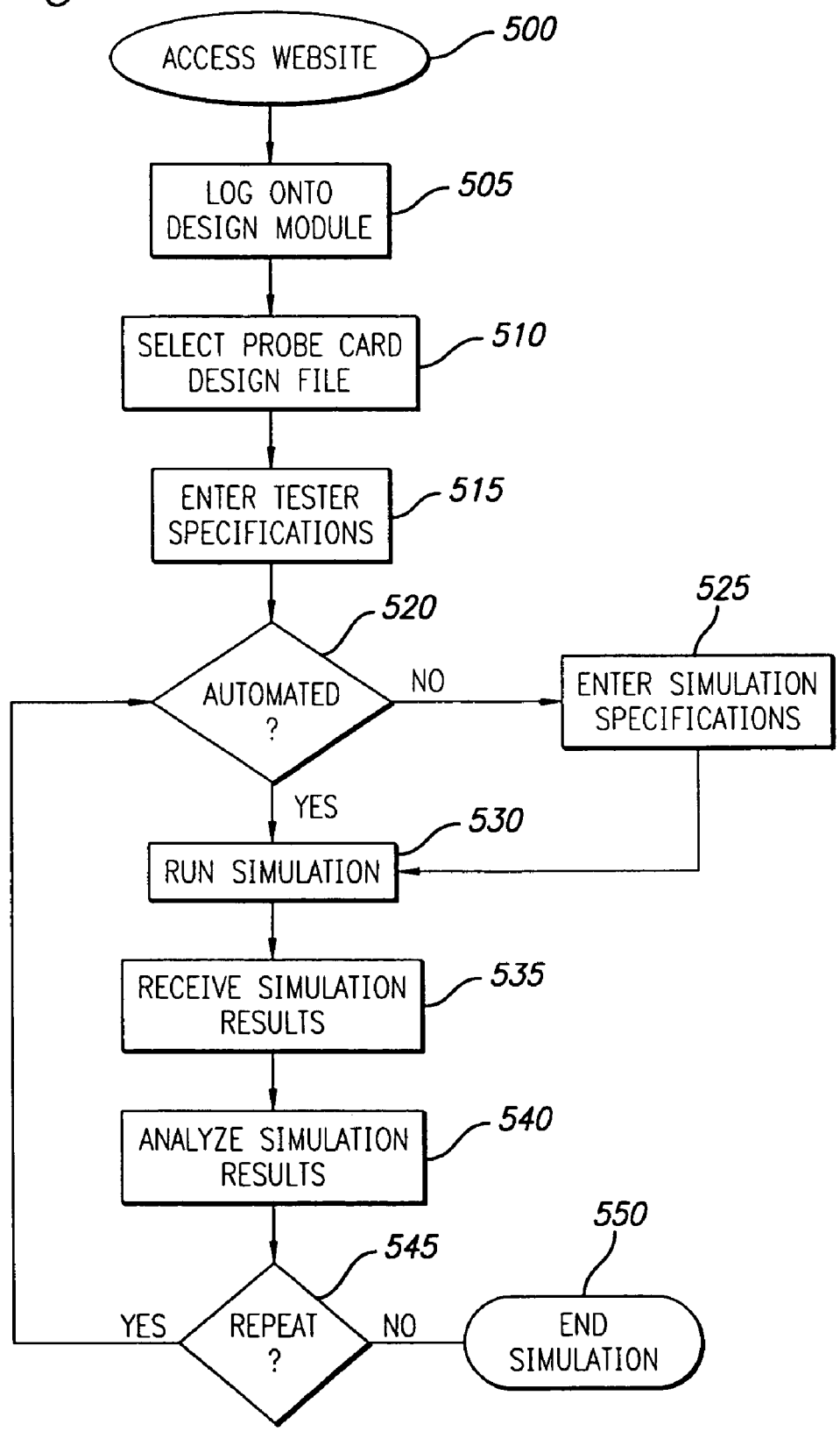
FIG. 6 is a flow chart illustrating the steps toward generating a probe card simulation according to an embodiment of the invention.

In a preferred embodiment, the probe card design website 220 is also used to interactively design a physical and electrical design that produces a highly optimized test interconnect system. In particular, this invention will enable customer 210 to verify the signal integrity of a proposed design and determine a calculated "worst case" signal response (i.e., system response to extreme values of individual signals) or decoupling behavior (i.e., system response to various signals operating simultaneously, such as under WC-BC environmental, material and fabrication process conditions). In FIG. 6, a flow chart illustrates the steps of a probe card simulation in which an overall system model is provided. Customer 210 begins this process by accessing the probe card design website 220 at step 500 and logging into the system at step 505. At step 510, customer 210 then proceeds by opening the desired probe card design file from the customer information database 228. In order to create an overall system simulation, specifications regarding the desired test equipment used by the customer 210 to test the probe card are entered at step 515.

At step 520, the customer 210 decide whether to run an automated simulation or a simulation based on particular specifications. In an automated simulation, responses to various signal characteristics and probe card layouts are determined automatically by the probe card design website 220. If the customer 210 chooses an automated simulation at step 520, the automated simulation is run at step 530. Otherwise, the customer 210 enters its desired simulation specifications at step 525 and then runs this customized simulation at step 530. In a preferred embodiment, customer 210 is able to choose from a wide variety of automated simulations embedded within the probe card design website 220. For example, a customer 210 may choose to perform a simulation emulating the system response to simply providing power to the newly-designed probe card, or a customer may choose to perform a higher-level simulation where a plurality of logic signals are all of a particular type (i.e., high or low). Customized simulations, where customer 210 wishes to ascertain the system response to specific signals, are also available in a preferred embodiment. Data reflecting any of these simulation results are received by the customer 210 at step 535 and analyzed at step 540. Depending on the desired specifications of the probe card, the customer 210 may then repeat this process in order to run another simulation at step 545 or simply end the simulation at step 550. While a multitude of simulations can be run, exemplary electrical simulations can be used to determine functional correctness, delay correctness, global and local signal skew (e.g., within specified groups or between all signals), crosstalk analysis (e.g., delay, induced, etc.), power integrity and jitter effects.

The device simulation described above can be performed in various ways. For example, spice models (i.e., models describing electrical performance), or other relevant data on the probe card performance could be exported to the customer 210 for inclusion in an overall modeling exercise including models for the device, and the automated test equipment system that will be used to test the device. Alternatively, data could be exported directly from the customer 210 to the probe card design website 220. By further example, a probe card simulation model can be embedded in a simulation engine that can be sent to customer 210. This will enable customer 210 to "feed" this model with vectors and generate response from modes, which can be analyzed. Expiration dates or hardware dongles can be built into the model to limit the simulations or applications. In cases where such data includes proprietary information requiring additional security, design simulation could proceed through a separate connection between the customer 210 and the probe card manufacturer. In this way, a complete simulation of the test process, including the effect of the probe card interconnect system, can be set up to verify the entire design, and predict the influence of the probe card integrated into a particular test system and comply with a given set of design rules.

In another embodiment, the simulation can take place live over the Internet. The probe card model will reside on the server (probe card design website) 220 of the probe card manufacturer and the simulation files as well as the expected response sent to the server 220 by customer 210. Upon completion of the simulation session, the result is sent back to customer 210. These communications will be accomplished through a secure channel, with encryption code, etc.

Having thus described a preferred embodiment of a method and system for designing a probe card, it should be apparent to those skilled in the art that certain advantages of the described system have been achieved. It should also be appreciated that various modifications, adaptations, and alternative embodiments thereof may be made within the scope and spirit of the present invention. The invention is further defined by the following claims.

What is claimed is:

1. A method of making a probe card, said method comprising:

receiving at a local computing system over a network from a remote computing system information describing a wafer to be tested;

generating at the local computing system a verification package in accordance with the information, the verification package including at least one electronic file describing a proposed design of a probe card for testing said wafer;

electronically determining an acceptability of the proposed design; and transmitting to the remote computing system the acceptability of said proposed probe card design.

2. The method of claim 1, further comprising providing a graphical interface for use by the user at the remote computing system to enable input of said information describing a wafer to be tested.

3. The method of claim 2, wherein said graphical interface comprises at least one Web page.

4. The method of claim 1, further comprising receiving at the local computing system from the remote computer system via said network an electronic order to manufacture said proposed probe card design.

5. The method of claim 1, further comprising electronically verifying said proposed probe card design at the local computing system.

6. The method of claim 1, wherein said verification package further comprises electronic files representing drawings of said proposed probe card design.

7. The method of claim 1, wherein the transmitting further comprises transmitting to the remote computing system proposed modifications to said proposed probe card design.

8. The method of claim 5, wherein the electronic verifying further comprises electronically simulating operation of said proposed probe card design.

9. The method of claim 5, wherein the electronically verifying further comprises performing an automated simulation of said proposed probe card design.

10. The method of claim 5, wherein the electronically verifying further comprises performing a simulation based on particular specifications designated by said prospective customer.

11. The method of claim 1 further comprising fabricating a probe card from said proposed probe card design.

* * * * *